United States Patent [19]

Walker et al.

[11] Patent Number: 5,046,327

[45] Date of Patent: Sep. 10, 1991

[54] AIR CONDITIONER CONVERSION KITS FOR VANS AND RECREATIONAL VEHICLES

[76] Inventors: Steve A. Walker, 1713 Delano, Malvern, Ark. 72104; Wayne S. Reese, 6400 E. Bradley Dr., Haltom City, Tex. 78117

[21] Appl. No.: 553,398

[22] Filed: Jul. 17, 1990

[51] Int. Cl.$^5$ .............................................. B60H 1/32
[52] U.S. Cl. ....................................... 62/244; 62/263; 98/2.11; 165/42; 165/53
[58] Field of Search ......................... 62/244, 263, 510; 98/2.11; 165/42, 43, 53

[56] References Cited

U.S. PATENT DOCUMENTS

| | | | |
|---|---|---|---|
| 2,263,476 | 11/1941 | Sunday | 165/43 |
| 2,712,737 | 7/1955 | Palmer | 62/263 |
| 2,883,161 | 4/1959 | Boylan et al. | 98/2.11 X |
| 3,648,592 | 3/1972 | Nieboer | 98/2.11 X |
| 3,841,108 | 10/1974 | Pierrat | 62/244 X |
| 3,984,224 | 10/1976 | Dawkins | 62/244 X |
| 4,051,691 | 10/1977 | Dawkins | 62/510 X |
| 4,736,597 | 4/1988 | Anderson et al. | 62/263 X |

Primary Examiner—William E. Tapolcai
Attorney, Agent, or Firm—Stephen D. Carver

[57] ABSTRACT

Air conditioning conversion kits ideally adapted to be retrofitted to vans, trailers, campers, or other recreational vehicles providing improved air conditioning efficiency and flexibility for campers. The kits are esthetically harmonious with the existing vehicle, both on the outside of the vehicle and on the inside. Our preferred systems enable use of the A.C. outlet at a campground or trailer park for air conditioning the vehicle while stopped, without running the engine or draining the battery. Bulk is reduced by physically separating the condenser from the evaporator. The preferred "Continental kit" version incorporates major structural air conditioning components within an attractive spare tire carrier disposed on the vehicle rear. The vented circular carrier attractively houses the condenser and the compressor, along with related accessories. The evaporator portion of the system is incorporated into the vehicle's interior door panel. The condenser is secured to a unique adapter receptacle which accommodates the "outdoor" air conditioning components in a visually attractive circular configuration. An alternative embodiment is disposed within a generally cubicle housing. An alternative evaporator includes dual coils, one for F-12 refrigerant from the vehicle's original air conditioning system, and one for the F-22 for refrigerant from our system. Electrical circuitry for operating the kits is disclosed. The circuits enable the devices to be plugged into an A.C. outlet, and to thereafter run the air conditioning without draining the vehicle battery.

12 Claims, 7 Drawing Sheets

AIR CONDITIONER CONVERSION KITS FOR VANS AND RECREATIONAL VEHICLES

BACKGROUND OF THE INVENTION

The present invention relates broadly to vehicle air conditioning systems. More specifically, the present invention relates to an improved auxiliary air conditioning structure which can be retrofitted into an existing van, camper, or other recreational vehicle ("RV") without detracting from the body design.

In the prior art known to us, a wide variety of air conditioning systems have been proposed for use in recreational vehicles. The majority of such systems involve mounting on the vehicle roof, and many are powered by external electrical sources when parked. Representative of such systems are U.S. Pat. No. 3,984,224, issued Oct. 5, 1976 to Dawkins; U.S. Pat. No. 4,134,275, issued to Erickson Jan. 16, 1979; and, U.S. Pat. No. 4,201,064, issued May 6, 1980 to Krug.

Numerous disadvantages are associated with the roof-mounted systems known to us. Structurally, many prior art systems are bulky and cumbersome. Typically, they are mounted with efforts and attention directed to functional rather than aesthetic considerations. As a result, the units tend to detract from the overall appearance of the vehicles, creating an unattractive, "top-heavy" profile.

Also, known prior art systems often make it more difficult to maneuver the vehicle. Roof mounted units can raise the height of the vehicle too much, lowering clearance. Interference with low hanging branches, for example, often results. Narrow passageways are typically found in campsites, recreational parks, airport entry ramps, home carports and garages. Travel vans must adequately traverse such restricted corridors, and they should maintain adequate visibility as well.

Further, seals between the roof panel and top-mounted units often deteriorate, resulting in air and water leakage. Air leaks increase noise levels and affect temperature control, thereby reducing passenger comfort. Water leaks may cause serious damage to the vehicle's interior and electrical system.

The operating efficiency of the vehicle also may be deleteriously affected by the additional bulk and weight of such prior art roof-mounted systems. Roof mounted units impede the air stream over the vehicle, increasing wind drag and reducing gas mileage. Fuel consumption is generally increased due to added weight and air resistance. In response to this problem, some reduced-profile units have been proposed in the prior art, such as Ferdows, U.S. Pat. No. 4,607,497 issued Aug. 26, 1986 and Armbruster, U.S. Pat. No. 4,217,764, issued Aug. 19, 1980.

As a rule, the prior art air conditioning systems known to us heavily tax the vehicle electrical system. In some systems, such as Harr U.S. Pat. No. 4,271,677 issued Jun. 9, 1981, auxiliary motors and generators are provided to correct this situation. However, such units add more weight and bulk.

Finally, the roof-mounted systems present difficulties when service is required. The servicing operator must position himself either on the vehicle roof and/or within the passenger compartment, neither site providing space for safe and comfortable access to the unit. An additional inconvenience is presented because the operator must take care to keep the vehicle interior covered to prevent material damage from footprints, falling components, fluid spills, or the like. Moreover, if the unit must be removed, the seals will be damaged and improper alignment of the unit may occur during reinstallation.

It has been proposed in the prior art to mount one or more components of the air conditioning system to parts of the vehicle body other than the roof. For example, U.S. Pat. No. 3,855,814 issued to Eubank on Dec. 24, 1974 teaches an air conditioning unit which mounts on the sidewall or on the drawbar of a camper trailer. The aforedescribed mounting affords convenient access for repairs and greatly reduces the risk that the unit will structurally damage the vehicle. However, it is impractical for use on self-propelled vehicles such as vans and recreational vehicles. The Ferdows unit of U.S. Pat. No. 4,607,497 comprises a roof-mounted unit having a separate compressor mounted to the rear of the vehicle. The unit is specifically adapted for large vehicles such as buses and the like.

Thus an auxiliary air conditioning system powered from an outside source such of A.C. electricity typically found in campgrounds, RV parks, and the like, which efficiently delivers a quiet stream of cooled air throughout the vehicle interior with a minimum of parts and without interfering with preexisting vehicle, structure is desired. No prior art air conditioning system known to us adequately addresses the goals of operational efficiency, convenience, cooperation with preexisting parts, and functional attractiveness.

SUMMARY OF THE INVENTION

Our new air conditioner conversion kits are adapted to be retrofitted to an existing van, trailer, camper, or other recreational vehicle ("RV") or enclosure. Each provides an improved efficiency air conditioning system which is esthetically incorporated into the existing vehicle. Our preferred systems enable use of the A.C. outlet at a campground or trailer park for air conditioning the vehicle while stopped without running the engine or draining the battery. To achieve a thin profile, the condenser and evaporator are physically separated from one another.

The preferred "Continental kit" version incorporates major structural air conditioning components within an attractive spare tire carrier on the rear door of the vehicle. The circular carrier attractively houses the condenser and the compressor, along with related accessories. The evaporator portion of the system is incorporated into the vehicle's interior door panel. The condenser is secured to a unique adapter receptacle which accommodates the "outdoor" air conditioning components in a visually attractive circular configuration. A rigid circular recessed cage formed within the receptacle is defined by a circular rib surrounded by parallel side walls. The cage is disposed within the receptacle by rigid, brackets projecting inwardly from the side walls, and the fan and its motor are mated to the cage. The receptacle further comprises a rigid shelf for vertically supporting the compressor system. The housing comprises a generally circular outer wall comprising a plurality of vents and an intake port covered by a rigid screen. Vigorous airflow through the system is assured.

The preferred evaporator assembly comprises a heat exchanger associated with an internal evaporator fan, both of which are disposed within the vehicle. They are housed within a panel adapted top be integrated into the vehicle door or wall. The associated electrical circuitry allows the apparatus to be used in conjunction with external A.C. power.

An alternative embodiment is disposed within a generally cubicle housing. This rectangular version is preferably mounted under the ladder typically located on custom vans on the door adjacent the wheel cover. Thus the external condenser system is incorporated into the body design and does not detract from the overall aesthetic appearance or functionality of the van.

When the system is used in the parked mode it can be plugged into an external source of 115-volt alternating current electricity The power converter provides a twelve-volt direct current output of sufficient capacity to furnish the power for the fan motors in the air conditioning unit. Also, a reserve DC power output connected to the vehicle battery keeps the battery charged, so that the user may operate the interior lighting, television or other D.C. powered van equipment or accessories. The converter can also recharge the vehicle battery under normal depleted conditions without the A.C. running. The conversion system operates the air conditioning unit without having high voltage A.C. wire into the vehicle interior.

Thus a broad object of the present invention is to provide an improved-efficiency vehicle air conditioning system.

Another broad object of the present invention is to provide an auxiliary air conditioning conversion system for retrofitting to vehicles so that they may be interiorly air conditioned without running their engines.

A similar object of the present invention is to provide an auxiliary vehicle air conditioning system which can easily be installed in vans, trailers, campers, and other recreational vehicles.

Another broad object of the present invention is to provide a vehicle air conditioning system which does not detract from the aesthetic appearance of the vehicle.

Another object of the present invention is to provide an attractive and efficient body-mounted vehicle air conditioning system of minimal bulk and physical size.

A related object of the present invention is to provide a vehicle air conditioning system of the character described which may be inconspicuously mounted to the vehicle body.

Another related object of the present invention is to provide a generally circular mounting system which fits the irregularly shaped components of vehicle air conditioning systems.

A further object of the present invention is to provide a vehicle air conditioning system of the character described which operates quietly and efficiently to cool the entire compartment of the vehicle.

Still another object of the present invention is to provide a vehicle air conditioning system which operates efficiently at a substantially reduced noise level.

An additional object of the present invention is to provide a vehicle air conditioning system of the character described which is durable, compact in design, efficient, and substantially weatherproof.

Yet another object of the present invention is to provide an air conditioning system of the character described which may be selectively connected to the vehicle electrical system or to an external source of electricity.

Another object is to provide a dual coil evaporator embodiment which uses the original equipment air blower and air handling components of the vehicle.

A further object of the present invention is to provide a vehicle air conditioning system of the character described which includes a fail-safe system for preventing shock injury as a result of improper connection or wiring.

Another object of the present invention is to provide a dual coil evaporator vehicle air conditioning system which can be conveniently controlled from the driver's seat in the travel mode.

Still another object of the present invention is to provide a vehicle air conditioning system of the character described which can be conveniently accessed for repairs and maintenance.

An additional object of the present invention is to provide a vehicle air conditioning system of the character described which does not require cutting or modifications in the vehicle roof, so that air and water leakage problems associated with prior art roof-mounted systems are avoided.

A related object is to provide a vehicle air conditioning system of the character described which is resistant to damage from impacts, and which is less susceptible to air and water leakage.

A further object of the present invention is to provide a vehicle air conditioning system of the character described which may be conveniently retrofitted to existing vans, trucks, trailers, or recreational vehicles.

Another object is to provide a vehicle air conditioning system of the character described in which the condensing unit components are mounted at a relatively low position, resulting in a favorable center of gravity.

Yet another is to provide a vehicle air conditioning system which can be selectively mounted to the vehicle body in a position which enhances air distribution and decreases wind resistance.

An additional object of the present invention is to provide a dual coil evaporative vehicle air conditioning system embodiment of the character described which employs the same evaporator and motor for cooling the rear compartment of the vehicle while traveling.

Another object is to provide a van conversion kit of the character described which does not raise the height of the vehicle or interfere with visibility.

Another object is to provide a vehicle air conditioning system of the character described which will provide a power converter built in with the condensing unit.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
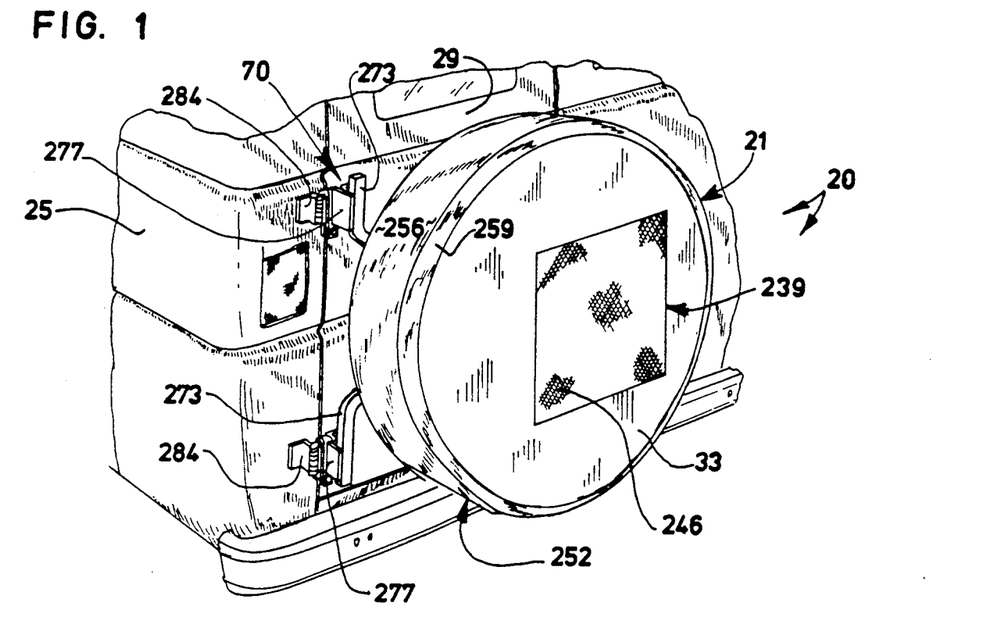
FIG. 1 is a fragmentary pictorial view illustrating a first embodiment of our new Air Conditioning Kit for Vans and Recreational Vehicles, with it installed in a conventional van.
Figure 9:
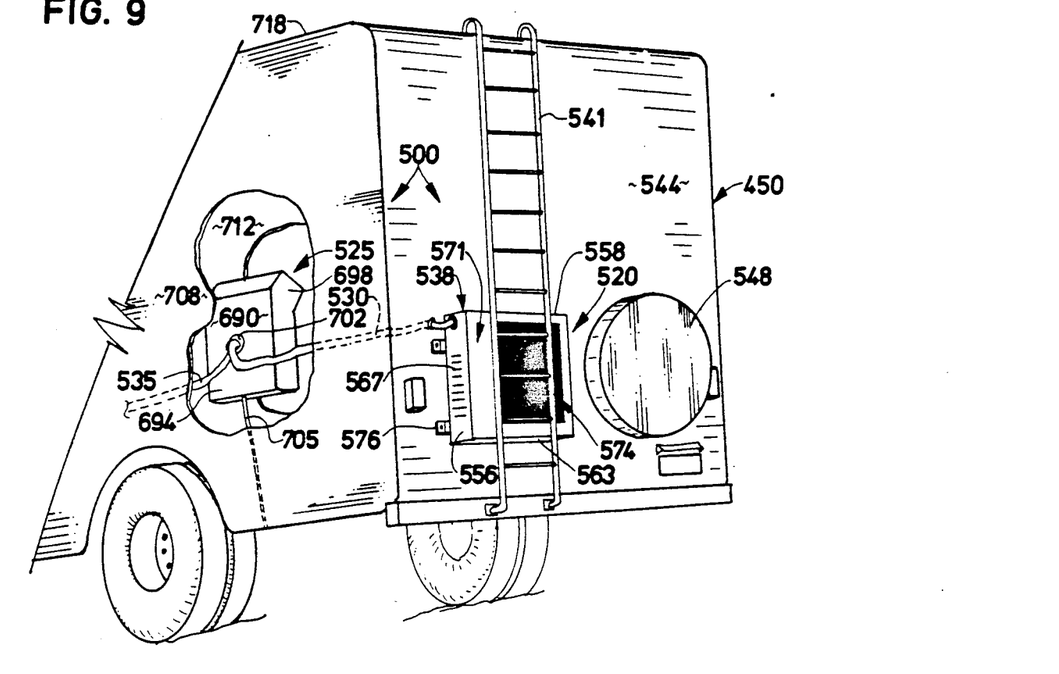
FIG. 9 is a fragmentary, rear perspective view of a second embodiment of our new system installed in a conventional RV.

With reference directed to the accompanying drawings, alternative embodiments of our new air conditioner system are illustrated in use in FIGS. 1 and 9. Our invention preferably comprises a conversion kit adapted to be retrofitted to an existing van, trailer, camper, or other recreational vehicle ("RV") or enclosure, all of which are generally referred to herein by the term "vehicle," whether or not they are self powered. The kit provides an improved efficiency air conditioning system which is incorporated in an esthetically pleasing manner into the body of the vehicle. Our preferred systems facilitate use of the A.C. outlet at a campground or trailer park, for example, so that an air conditioned environment can be maintained without running the vehicle engine, and/or without draining the vehicle battery. Of course it will be noted by those skilled in the art that our system need not be limited to a kit for retrofitting, but it could instead be installed as original equipment.

Figure 2:
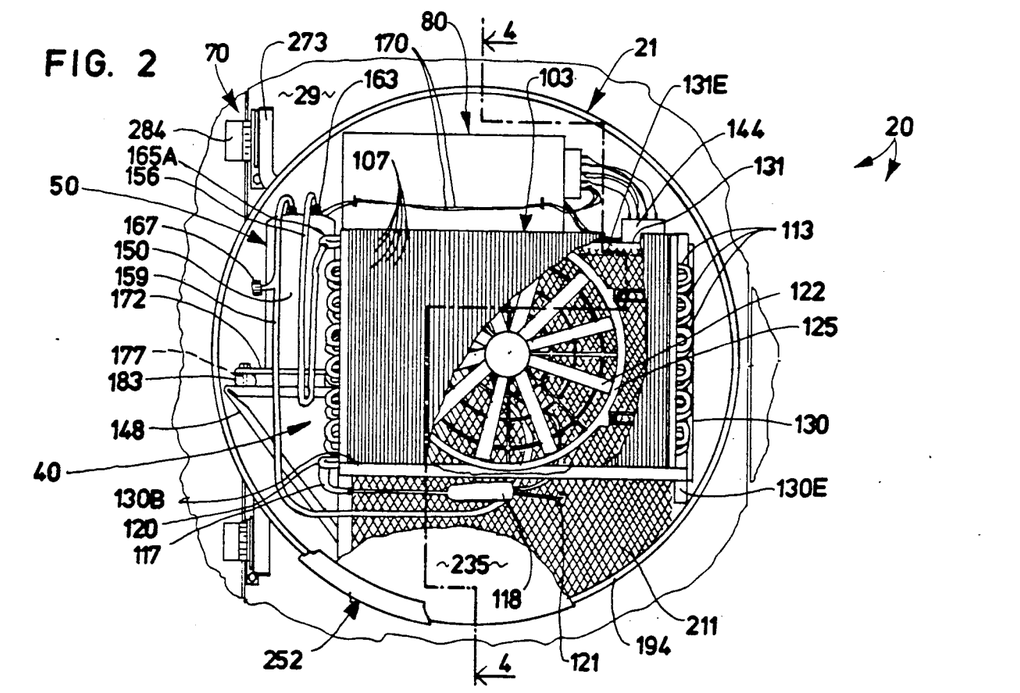
FIG. 2 is an enlarged, fragmentary rear elevational view in which portions are broken away or shown in section for clarity.
Figure 3:
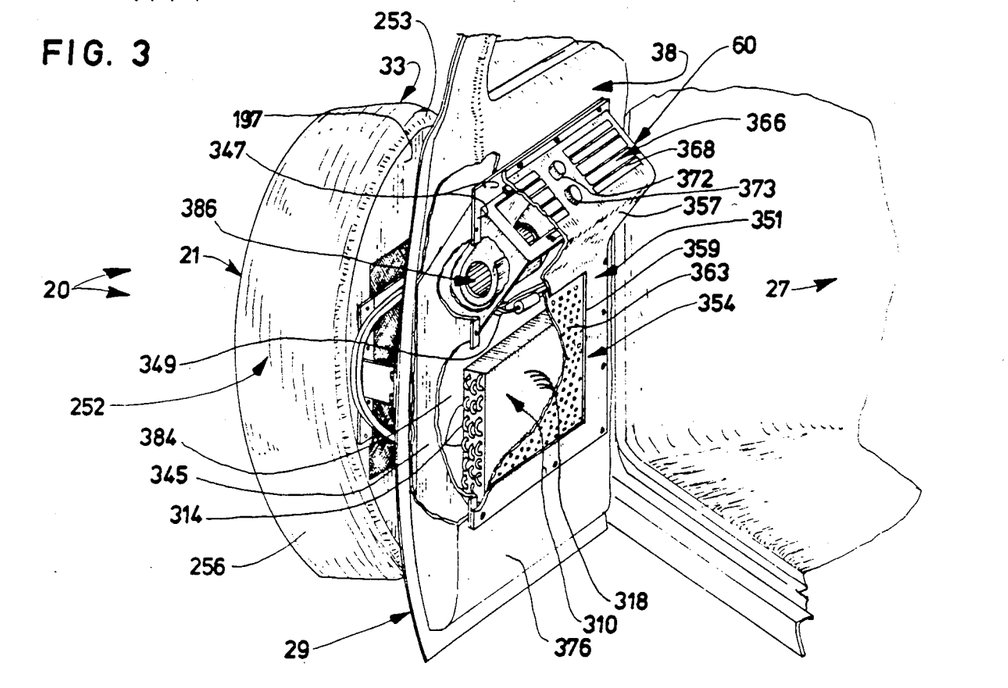
FIG. 3 is a fragmentary pictorial view illustrating the partially opened rear door of a van having our new system installed, in which portions are broken away for clarity.

With initial reference directed now to FIGS. 1-5, the best mode of our invention, broadly designated by the reference numeral 20, comprises a "Continental kit" version which incorporates major structural air conditioning components within an ornamentally pleasing spare tire carrier 21 mounted on the rear door 29 of typical custom passenger van 25 by a hinged bracket assembly 70. As best viewed in FIG. 1, the external portion of the system (i.e. those parts such as the compressor mounted outside the vehicle) may be inconspicuously mounted within carrier 21 behind the external circular face plate 33. As illustrated in FIG. 3 and as will be described later, the evaporator portion 60 (FIG. 5) of the system is preferably flushly incorporated into the vehicle's interior 27 (FIG. 3) within door panel 38, so that it esthetically blends with the interior decor. It will be appreciated that condenser assembly 40 mounted as described replaces the spare tire mounting for the van. Thus the spare tire must be stored under the seat or elsewhere within the passenger compartment. Sometimes this arrangement may be undesirable, particularly where the van or vehicle is used for hauling large loads. Thus, we have provided an alternative housing seen in FIGS. 9, 10 to be described in detail hereinafter.

With joint reference to FIGS. 1-6, kit 20 comprises a condenser assembly broadly designated by the reference numeral 40, a compressor system 50, and an evaporator assembly broadly designated as 60. Where desired, an optional power converter system 80 may be installed to enable switching between alternate power supplies for evaporator fan motor operation. The air conditioning system 20 may also be coupled for selective use in conjunction with an existing factory-installed automotive air conditioning system. These various alternative operating modes are described in detail hereinafter.

The condenser assembly 40 preferably comprises a radiator-like heat exchanger 103 comprising a plurality of rigid, parallel aluminum cooling fins 107 penetrated by a plurality a tubular, copper refrigerant coils 113. Coils 113 extend generally horizontally through exchanger 103 and are preferably aligned in a plurality of parallel, spaced apart rows. In this embodiment, heat exchanger 103 may comprise a wider profile version having three parallel rows of coils or a narrower version having two rows of coils. Condenser heat exchanger 103 is operatively linked to the evaporator assembly 60 via a line 117 (FIG. 2) attached to a condenser outlet header (not shown) in fluid flow communication with a conventional dryer bulb 118 and an expansion valve 166 (FIG. 4), terminating in a suitable fluid-distributing header 165 within the evaporator. Preferably line 117 also comprises a gauge port 121 (FIG. 2) adapted to facilitate evacuation of the system for routine maintenance and repairs. The condenser receives hot, pressurized gaseous refrigerant from the compressor via discharge line 156 (FIG. 2).

Condenser heat exchanger 103 is secured to an adapter receptacle 129 (FIG. 5), which facilitates the mounting of the 1 external air conditioning components into a generally circular configuration. Peripheral flanges 105 in exchanger 103 are fastened to sides 130 of receptacle 129. The receptacle top 131 supports power converter 80. The condenser fan 122 and its companion D.C. drive motor 123 (FIGS. 5, 7A) are enclosed within a rigid circular recessed cage 125 formed within receptacle 129 and defined by circular rib 125A. The opposed parallel side walls 130 of receptacle 129 integrally project downwardly from planar top 131 generally on opposite sides of enclosed cage rib 125A.

Figures 5, 6, 7A, 7B:
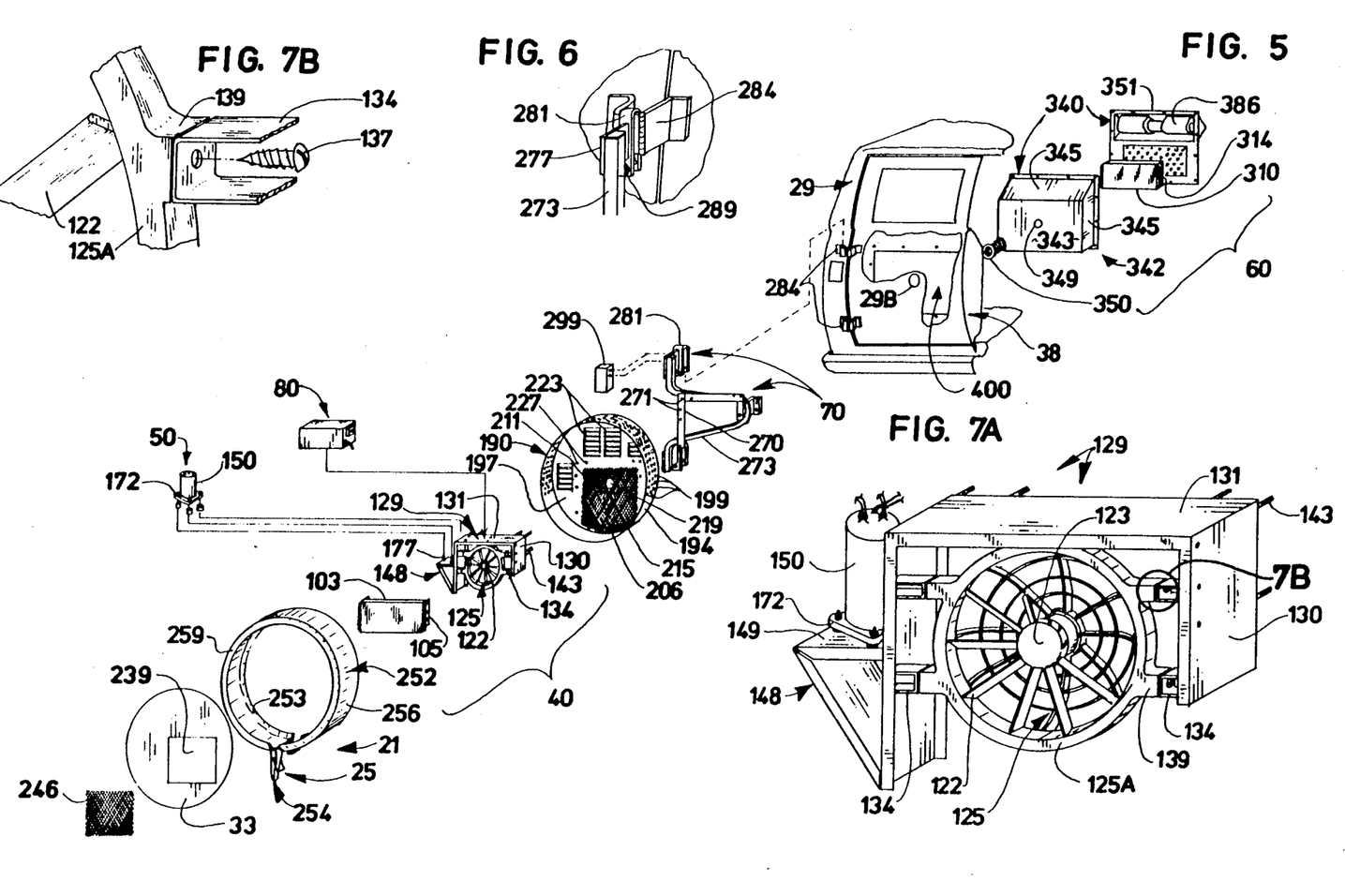
FIG. 5 is an exploded assembly view, with portions thereof broken away or shown in section for clarity.
FIG. 6 is an enlarged, fragmentary, perspective view of the preferred hinge bracket.
FIG. 7A is an enlarged, fragmentary isometric view of the preferred adapter receptacle.
FIG. 7B is an enlarged, exploded fragmentary isometric view of detail 7B in FIG. 7A, showing the preferred condenser fan mounting bracket assembly.

As seen in FIGS. 5 and 7A cage 125 is suspended centrally within receptacle 129 by a plurality of rigid, generally U-shaped brackets 134. Brackets 134 project inwardly from side walls 130 of receptacle 129 to which they are welded, and they are terminated by fasteners 137 to rigid mounting bosses 139 extending from fan cage rib 125. This mounting suspends fan 122 to dampen and minimize the impact of shocks. Rigid threaded studs 143 extend rearwardly from receptacle 129 to facilitate mounting of the housing within generally circular Continental kit casing 190 secured to hinge bracket 70. Receptacle 129 further comprises a rigid shelf 148 of generally triangular cross section which projects outwardly from receptacle 129's side, and has a planar surface 149 to support the compressor system 50.

Figure 4:
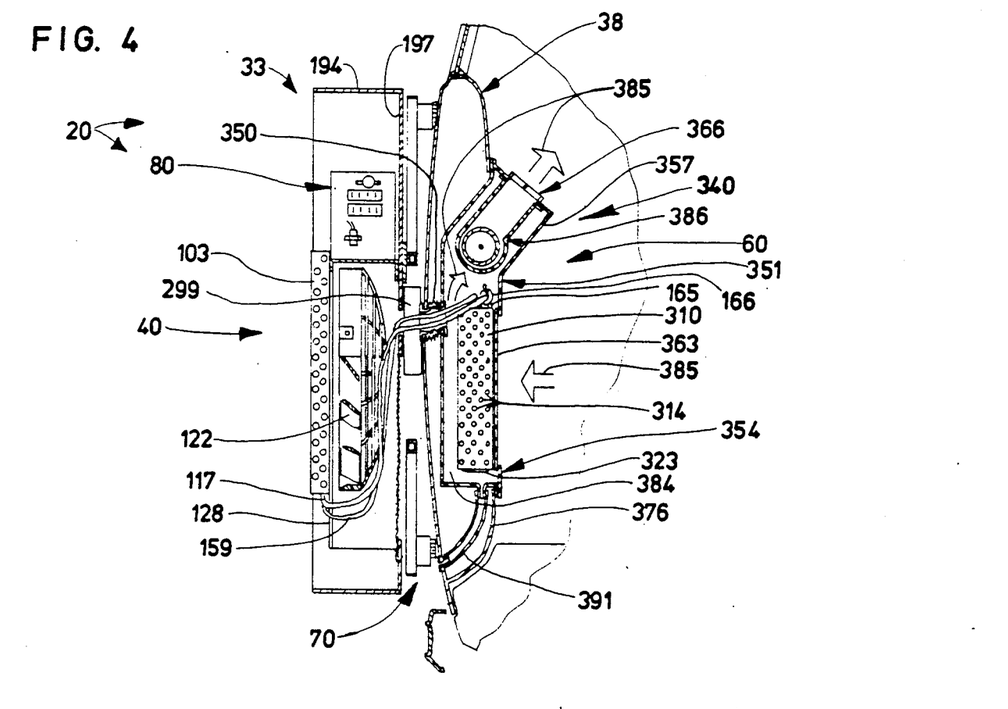
FIG. 4 is a fragmentary sectional view taken generally along line 4—4 of FIG. 2.

With reference to FIGS. 2 and 4, compressor system 50 comprises a cylindrical, rotary compressor tank 150 operatively coupled to condenser coils 103 by a discharge line 156 and to the evaporator assembly 60 by a suction line 159. Lines 156, 159 preferably comprise copper tubing coupled to tank 150 by appropriate pressure fittings 163 (FIG. 2). Line 156 is coupled to fluid distribution headers 165A associated with the condenser which distribute refrigerant. Preferably suction line 159 comprises a conventional gauge port 167 adapted to facilitate evacuation, routine maintenance, and repairs. Compressor 50 is electrically coupled to the evaporator assembly by a plurality of wires 170 via relay box 144 as described hereinafter.

Compressor tank 150 comprises a rigid, integral base plate 172 which is supported upon a plurality of rigid, insulated mounting posts 177 (FIGS. 2, 5) projecting upwardly from shelf 148 on receptacle 129. A plurality of resilient, shock-dampening spacers 183 (FIG. 2) are axially fitted about each of the posts 177 to resiliently suspend tank 150 suspended above shelf 148.

As illustrated in FIG. 5, rigid casing 190 comprises a cylindrical outer wall 194 projecting from and peripherally surrounding rear wall 197. Outer wall 194 comprises a plurality of vent orifices 199. Rear wall 197 comprises an intake port 206 preferably covered by a rigid screen 211. A rigid mounting plate 215 defined in the center of rear wall 197 is drilled to provide a inlet 219 communicating with the interior panel 38 of the van. Rear wall 197 is also vented by plurality of louvers 223. A plurality of mounting orifices 227 are defined through rear wall 197 to receive receptacle mounting studs 143 and for facilitating mounting to bracket assembly 70. Studs 143 register with appropriate orifices 227 in wall 197 and subsequently penetrate orifices 271 in bracket assembly 70, being secured by suitable nuts.

When the condenser assembly 40 is properly mounted, casing 190 is covered by generally circular face plate 33. It will be appreciated that the outer surface of face plate 33 should be protectively finished to match or harmonize with the van body. As best viewed in FIG. 1, face plate 33 comprises a generally square air exhaust port 239 covered by a rigid, mesh guard 246. Guard 246 protects the condenser assembly from damage potentially resulting from impacts by miscellaneous objects, and it prevents entry into the system by animals. In addition, guard 246 substantially "filters" out other potentially destructive substances such as sand, leaves, trash, rain, and other fluids.

Face plate 33 is secured to casing 190 by a rigid, decorative chrome ring 252. The circular ring 252 comprises a rigid, outer wall 256 and integral, opposed inwardly turned edges 253, 259 (FIGS. 1, 3). Edge 259 projects inwardly over plate 33 in assembly to seal it against casing 190. Ring 252 is snap-fitted over casing 190 and locked by a suitable latch 254. Thus the external components of the system 20 are securely housed within carrier 21, which is mounted to the van door 29 by bracket assembly 70.

With reference to FIGS. 1, 5, and 6, the preferred bracket assembly 70 comprises a rigid L-shaped leg 270 welded to a rigid yoke 273. Yoke 273 comprises a plurality of rigid couplings 277 (FIG. 6) which extend outwardly from yoke 273 and terminate in rigid U-shaped clamps 281. Clamps 281 slidably mount upon the rigid hinges 284 which project outwardly from door 29. Clamps 281 may be locked by rigid pins 289 or similar fasteners. Yoke 273 also rigidly mounts a generally cubicle ground fault interrupter 299 which normally remains concealed behind kit 21 (FIG. 4).

With primary emphasis now on FIGS. 3 and 4, our preferred evaporator assembly 60 broadly comprises a heat exchanger 310 associated with an internal evaporator fan, and housed in a rigid, generally rectangular housing 340 (FIG. 4). Housing 340 is mounted in a suitable port 400 defined through the van door interior panel 38. Heat exchanger 310 comprises a generally rectangular body comprising a plurality of fluid-carrying coils 314 arranged in parallel rows between fins 318, preferably comprising a plurality of elongated aluminum strips. Each of the coils 314 comprises a unitary length of copper tubing, and communicates with other coils via flared header 165. Header 165 is coupled to an expansion valve 166. Heat exchanger 310 preferably comprises four or five rows of coils 314 and a spaced-apart row comprising a suction header 323, which is coupled to suction line 159 associated with the condenser assembly. Vehicle air is drawn through the heat exchanger 310 by a motor-powered fan. Heat exchanger 310 is mounted within rigid evaporator housing 340.

Evaporator housing 340 comprises a rigid, generally rectangular shell 342 preferably fabricated of a lightweight material such as plastic or the like. Shell 342 comprises a rear wall 343 and four side walls 345. Rear wall 343 is drilled to define an inlet 349. Lines 117, and 159 and wires 170 are received into housing 340 via inlet 349. A flexible, moisture-proof seal 350 extends between inlet 349 and a suitable orifice 29B drilled through door 29. Side walls 345 terminate in an outwardly projecting lip 347 which defines a mounting surface for evaporator cover 351. Cover 351 is preferably mounted by a plurality of screws which penetrate lip 347 of the shell 342.

As best viewed in FIG. 3, cover 351 comprises a generally planar, front panel 354 integral with an outwardly projecting blower panel 357. Front panel 354 comprises an air intake port 359 preferably shielded by a rigid filter panel 363. Blower panel 357 comprises a pair of air discharge ports 366 which mount pivotal air flow-control louvers 368. Temperature and speed control knobs 372, 373 protrude through panel 357 for convenient access. As best viewed in FIG. 4, the assembled housing 340 defines an air chamber 384 around heat exchanger 310. Air drawn from the van interior through air intake port 359 is circulated through exchanger 310, drawn upwardly, and blown out through the air discharge ports 366 as indicated by the arrows 385. Preferably the air is circulated by a motor-powered blower 386 such as a conventional double squirrel cage fan or the like. A flexible drain tube 391 drains condensate collected in the evaporator.

The assembled evaporator unit 60 is preferably installed so that the edges of cover 351 closely abut the edges of the decorative door panel covering 376, which typically consists of wood paneling or fabric. Cover 351 is preferably molded of a plastic or similar material colored to blend or coordinate with the interior color scheme of the van. Thus the housing is attractively mounted so that it does not detract from the aesthetic appearance of the interior, which is of particular importance in a custom van.

Esthetics are also considered when the system is installed in a larger vehicle, such as an RV, trailer, or the like. However, because air distribution demands are distinctive in an RV, some structural and operative modifications are required. Thus our system 20 comprises an alternative mounting suitable for use in larger vehicles.

Figure 10:
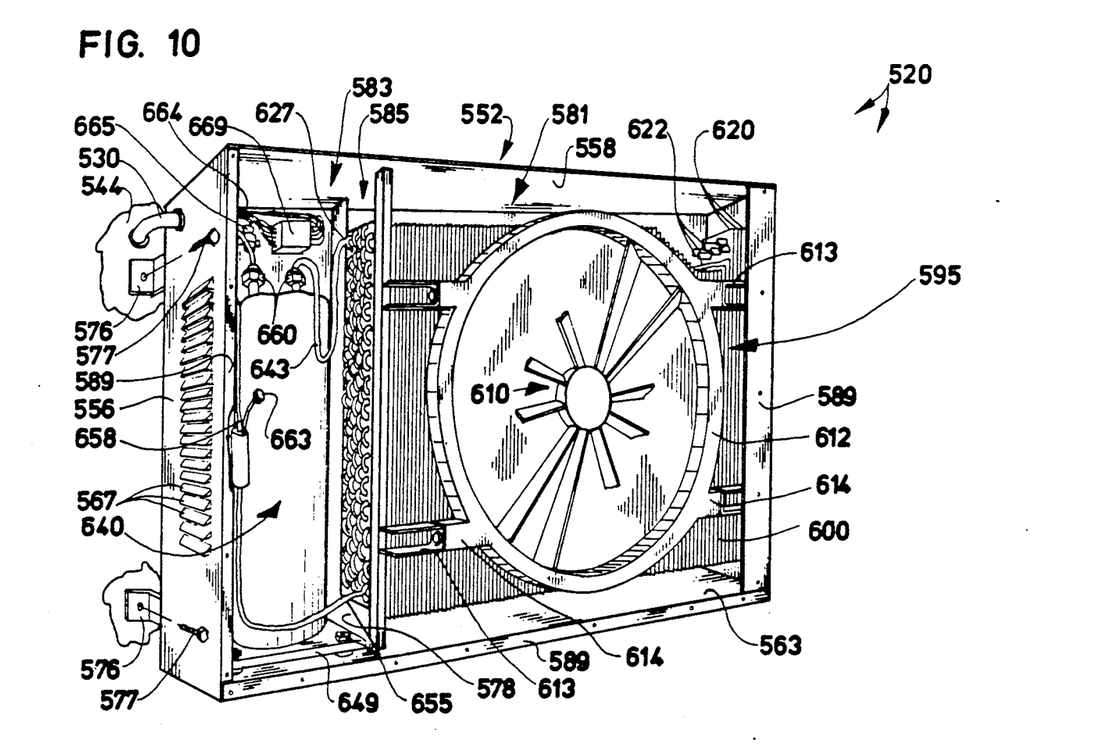
FIG. 10 is an enlarged, fragmentary, rear perspective view of our second embodiment.

With reference now directed to FIGS. 9 and 10, an alternative embodiment 500 is illustrated in use on a conventional recreational vehicle 450. The alternative mounting is similar in appearance to that shown on the RV in FIG. 9. The condenser housing comprises a rigid, generally rectangular casing preferably coated with a protective finish which matches or harmonizes with that of the van. The rectangular or "flat" casing is preferably mounted under the ladder typically located on custom vans on the door adjacent the wheel cover. Thus the external condenser system is incorporated into the body design and does not detract from the overall aesthetic appearance or functionality of the van. It will be appreciated that the alternative flat casing is narrower in profile so that it can be fitted under the ladder. Hence it is desirable to use the narrower two-coil version of heat exchanger 103. The remaining structure is substantially identical to the aforedescribed wheel cover version, although it must be repositioned to properly register with the condenser assembly.

System 500 comprises an externally mounted condenser unit 520 (FIG. 10) linked to an internally mounted evaporator unit 525 (FIG. 9) by a flexible conduit 530. Where desired, the system may be coupled to an existing vehicle air conditioning system via conduit 535, as explained hereinafter. The condenser assembly 520 comprises a narrow profile or "flat", generally rectangular housing 538 which can be attractively installed beneath the ladder 541 typically found on the rear wall 544 an RV 450. Preferably the housing 538 is protectively coated to match or harmonize with the RV finish. The RV conversion kit may also be configured to mount within the RV wheel cover 548 as in the aforedescribed van kit 20. Either mounting permits the system 500 to be incorporated without detracting from the appearance or functionality of the RV.

Housing 538 comprises a rigid, generally rectangular casing 552 having parallel side walls 556 spaced apart between planar top 558 and bottom 563. Side walls 556 comprise a plurality of vents 567. The planar cover 571 comprises an air intake port covered by a rigid filter screen 574. A plurality of rigid brackets 576 extend rearwardly from casing 552 to mount the housing 538 upon the RV rear wall 544. Preferably the housing is secured by rigid carriage bolts 577 or similar fasteners.

As best viewed in FIG. 10, casing 552 is subdivided by a rigid panel 578 into two compartments 581 and 583, which communicate via window 585. Rigid edges 589 extend integrally from walls 556 and bottom 563 and are appropriately drilled to define a mounting surface for the planar cover 571. Compartment 581 mounts the condenser assembly broadly designated by the reference numeral 595.

Condenser assembly 595 comprises a heat exchanger 600 associated with a motor-powered fan 610 flush mounted in a rigid, circular cage 612. Fan cage 612 is dynamically suspended within housing 538 by brackets 613 rigidly coupled to bosses 614. Heat exchanger 600 preferably comprises a plurality of fins 620 penetrated by four or five parallel rows of coils 622 comprising copper tubing. Coils 622 communicate via a fluid-distributing header 627 which couples condenser 595 to rotary compressor 640 via discharge line 643. Compressor 640 is suspended within compartment 583 upon a shelf 649 mounted on shock-absorbent posts 655 similar to posts 177 of system 20. Compressor 640 is also coupled to the evaporator unit 525 via liquid line 658. Line 643 is secured to compressor 640 by high-pressure fittings 660. Suction line 658 preferably comprises a service gauge port 663 adapted to receive a suitable gauge for maintenance and repairs. Electrical connection as described hereinafter are made via wires 664 which terminate in run capacitor 665 and relay box 669. Line 658 an 664 are protectively shielded within flexible conduit 530, which operatively links the external condenser unit 520 to the internal evaporator unit 525.

The evaporator unit 525 comprises a housing 690 preferably identical in construction and arrangement to housing 340 of system 20. Housing 690 comprises a heat exchanger housed within an air chamber 694 associated with an outwardly projecting blower panel 698. Conduits 530, 535 enter housing 690 via an appropriately sealed inlet 702. A flexible tube 705 drains water collected within the evaporator unit 525.

The evaporator unit 525 may be selectively mounted at any position within the RV which affords the most favorable air flow. FIG. 9 illustrates one possible mounting of the evaporator unit 525 between side wall 708 and interior wall 712. Where desired, the unit 525 might also be mounted beneath the roof 718. Preferably the unit 525 is attractively incorporated into the wall 712 and colored to blend with the interior color scheme. Thus the van kit 20 and the RV kit 500 comprise similar structure which can be alternatively mounted in an esthetically appealing manner within the wheel cover or under the vehicle ladder.

As discussed hereinafter, either kit 20 or kit 500 may be operatively configured to function independently or in conjunction with a pre-existing factory-installed vehicle air conditioner system. Accordingly, the systems may be configured to function from the pre-existing internal DC power system or from an external source of AC electricity by a power converter.

Figure 8:
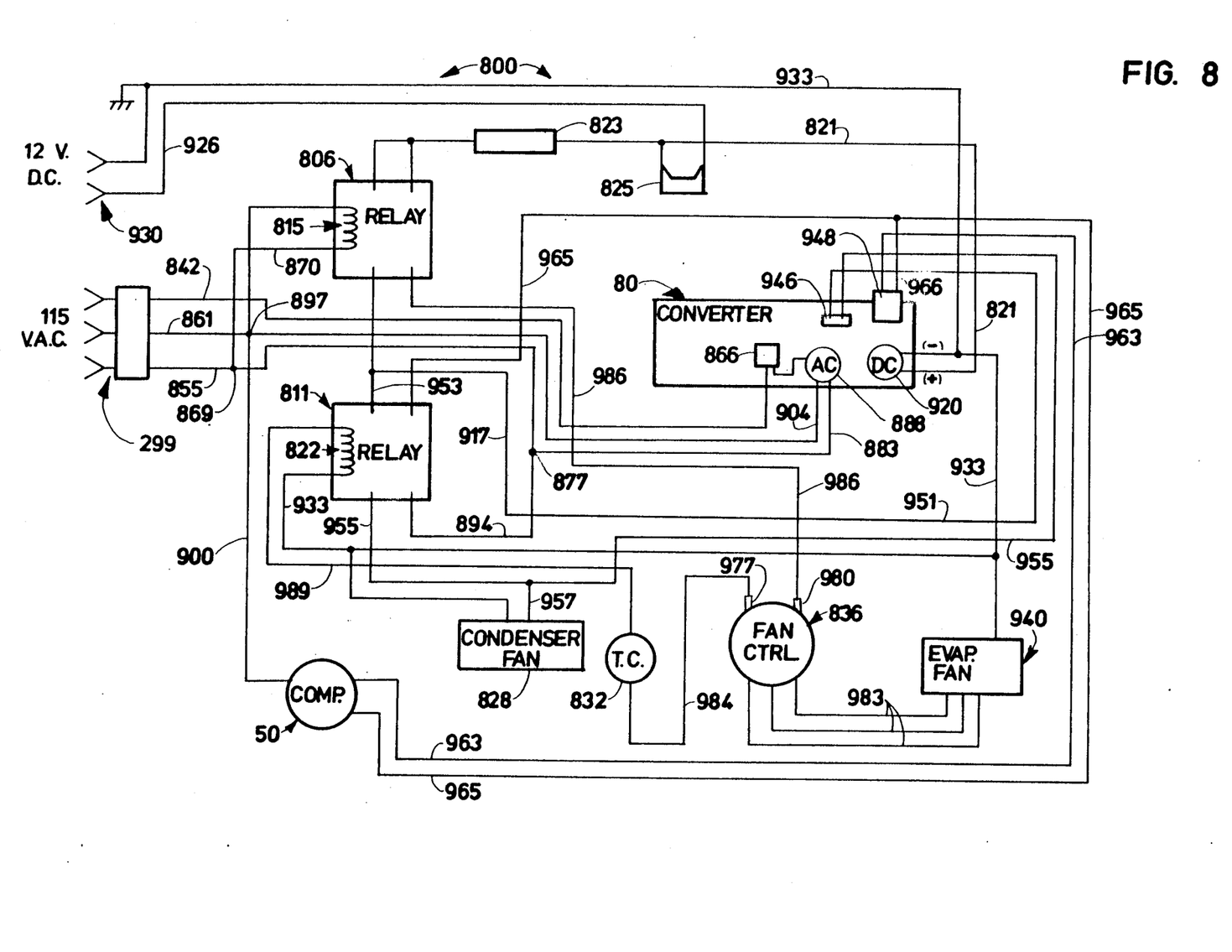
FIG. 8 is a preferred circuit diagram for the first embodiment.

FIG. 8 illustrates the preferred electrical circuit 800 for use with an external A.C. power source when the vehicle is parked. The system is adapted to operate on 115-V AC power supplied via electrical outlets typically situated in recreational areas or campgrounds. The system is preferably designed for a cooling capacity of roughly seven to twelve thousand BTU.

The electrical system of kit 20 comprises a conventional ground fault interrupter 299, and a power relay 806 and control relay 811 (FIG. 8) associated with relay box 144, 669. Relays 806, 811 comprising field coils 815, 822 provide power responsive control logic switching. Power relay 806 is coupled through circuit breaker 823 and line 821 to direct current from converter 80. Control relay 811 is electrically coupled to fan motor 828, thermostat control 832, and fan controls 836. The power convertor 80 switches A.C. current, and converts A.C. to twelve volt regulated D.C for fan motor operation and relay logic.

115-V alternating current is inlet via the ground fault interrupter 299 across lines 855 and 861. The interrupter circuit 801 trips to prevent serious shock injury to the user in the event the system is either incorrectly coupled to the power source, or the power source was incorrectly wired. Interrupter circuit 801 comprises a ground line 842 coupled to a corresponding ground lug 866 on power converter 80. Line 855 comprises node 869 which couples line 855 to line 870 leading to power relay field coil 815. Line 855 terminates in a second node 877, which couples it via line 883 to AC-input terminal 888 in power converter 80 and via line 894 to control relay 811. Line 861 is connected at node 897 to line 900 leading to compressor 50 and relay field 815. Node 897 links line 861 to line 904 which terminates at junction-input 888 on the power converter 80.

Incoming 115 V.A.C. travels via ground fault interrupter circuit 801 to converter 80 and is outputted as twelve volt DC via converter outlet 920 across lines 821 and 933. Outlet 920 leads via lines 821, breaker 825 and line 926 and line 933 to an outlet 930 adapted to be connected to the vehicle battery for possible recharging. The return circuit to battery 930 is protected by the preferably 30-amp DC circuit breaker 825. Feedback from the battery is prevented from damaging the power converter 80 by diodes within the converter. A direct current ground (i.e. chassis ground) is referenced on line 933.

A heat sensor switch 946 and a run capacitor 948 are also associated with the power converter 80. Run capacitor 948 is coupled to the rotary compressor 50 via lines 963 and 965. Switch 946 is electrically coupled via lines 951, 953 to the control relay 811 and via lines 955, 957 to the condenser fan 828. The heat sensor switch 946 is provided to protect the system from overheating.

The evaporator fan control 836 comprises a power-off contact 977, a power-on contact 980, and a three-contact speed selection switch capable of high, medium, and low speed settings. The speed selection lines 983 are electrically coupled to corresponding contacts H2, M2, L2 associated with the evaporator fan motor 940 physically disposed within the vehicle. Power-off contact 977 is coupled via line 984 to thermostat 832 which leads via line 989 to holding coil 822 on control relay 811. Power-on contact 980 is coupled via line 986 to power relay 806.

As long as the circuit is "plugged in" and lines 855, 861 are "hot" the D.C. supply circuitry (i.e. from converter 80) and relay 806 will both be "on." Unless a circuit breaker or fuse trips, or component overheating or burnout occurs, the air conditioning compressor and the fans can then be switched on as desired. When system 20 is activated by knob 372 (FIG. 3) inside the vehicle, positive D.C. voltage is available from relay 806 on lines 953, 917 and 986. Relay field 822 is grounded on line 933, and the other side is connected to positive voltage appearing on line 989, from thermostat 832, line 984, fan control 836 and line 986 from relay 806. Lines 983 from fan control 836 operate the evaporator fan motor 940. The compressor motor lines 963 and 965 will transmit A.C. power switched by relay 811 from line 894. Power is also delivered via control relay 811 to capacitor 948 via line 966 which leads to compressor 50 via lines 965. DC current is delivered from the power convertor 80 via line 821 through the power relay 806 and via line 986 to the power-on contact 980 of the evaporator, and the system is ready to operate.

The circuit is protected by the preferably 25-amp circuit breaker 823 associated with line 821. Thus the system 20 may be safely and efficiently operated from an external AC power source while the vehicle is parked. The system as described operates independently of the vehicle-powered system. However, where desired, our conversion kit may also be connected for operation in conjunction with an existing factory-installed air conditioning system.

Figure 12:
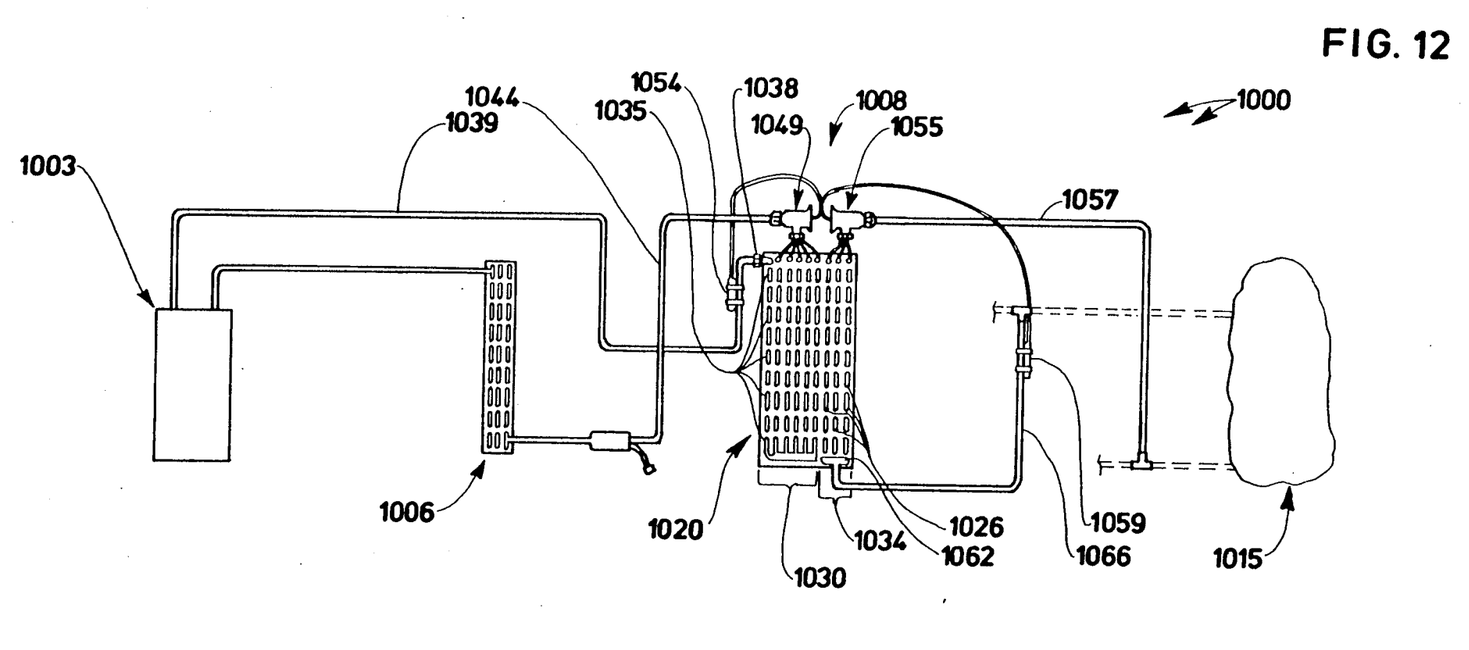

With reference now directed to FIG. 12, an alternative installation of our kit is generally designated by the reference numeral 1000. Kit 1000 comprises substantially the same structure as the aforedescribed systems 20, 500, preferably comprising a 115-V A.C. rotary compressor 1003 operatively linked to the externally-mounted condenser 1006, and the internally-disposed evaporator 1008. However, the present alternative installation requires employment of a substantially modified "dual coil" evaporator 1008 specifically adapted for connection to the conventional auto vehicle air conditioning system broadly designated by the reference numeral 1015 (FIG. 12).

Evaporator 1008 preferably comprises a heat exchanger 1020 mounted within a rigid housing 1024 adjacent an evaporator fan (not shown). The heat exchanger 1020 comprises a plurality of heat-dissipating aluminum fins penetrated by a plurality of rows of tubular copper coils 1026. The diameter and the number of coils 1026 incorporated in exchanger 1020 will be determined in accordance with the load demands of the particular vehicle. The exchanger 1020 illustrated in FIG. 12 is designed for an output capacity of roughly seven to twelve thousand BTU, comprising a first circuit 1030 and a separate second circuit 1034, both of which can cool by traveling through the evaporator. Circuit 1030 is operatively coupled to the a conversion system 20, 500 for cooling the entire vehicle when parked. It uses F-22 refrigerant. Circuit 1034 is operatively coupled to the automotive air conditioning system 1015 by suitable T-connections for cooling the rear compartment during travel. An important advantage associated with employment of the "dual coil" system of installation 1000 is that both the front and rear compartments of the vehicle 450 can be efficiently cooled without the use of auxiliary motors or generators such as are typically associated with prior art roof-mounted RV air conditioner systems.

Evaporator circuit 1030 preferably comprises five rows of coils 1026, and a sixth row of coils comprises a fluid-distributing header 1035. Header 1035 is coupled by appropriate fittings 1038 to suction line 1039 associated with the compressor 1003. Circuit 1030 is also coupled to fluid line 1044 associated with the condenser 1006 by a fluid-distributing flare header 1049. Flare header 1049 comprises an internally disposed valve operatively coupled to an evaporator valve bulb 1054.

Evaporator circuit 1034 preferably comprises three rows of coils 1026 linked via a fluid-distributing flare header 1055 to the fluid line 1057 of vehicle system 1015. Flare header 1055 comprises an internally disposed valve associated with an feller valve bulb 1059. A header 1062 establishes communication between circuit 1034 and suction line 1066 associated with the vehicle air conditioning evaporator typically located under the dashboard in the driver's compartment.

Figure 11:
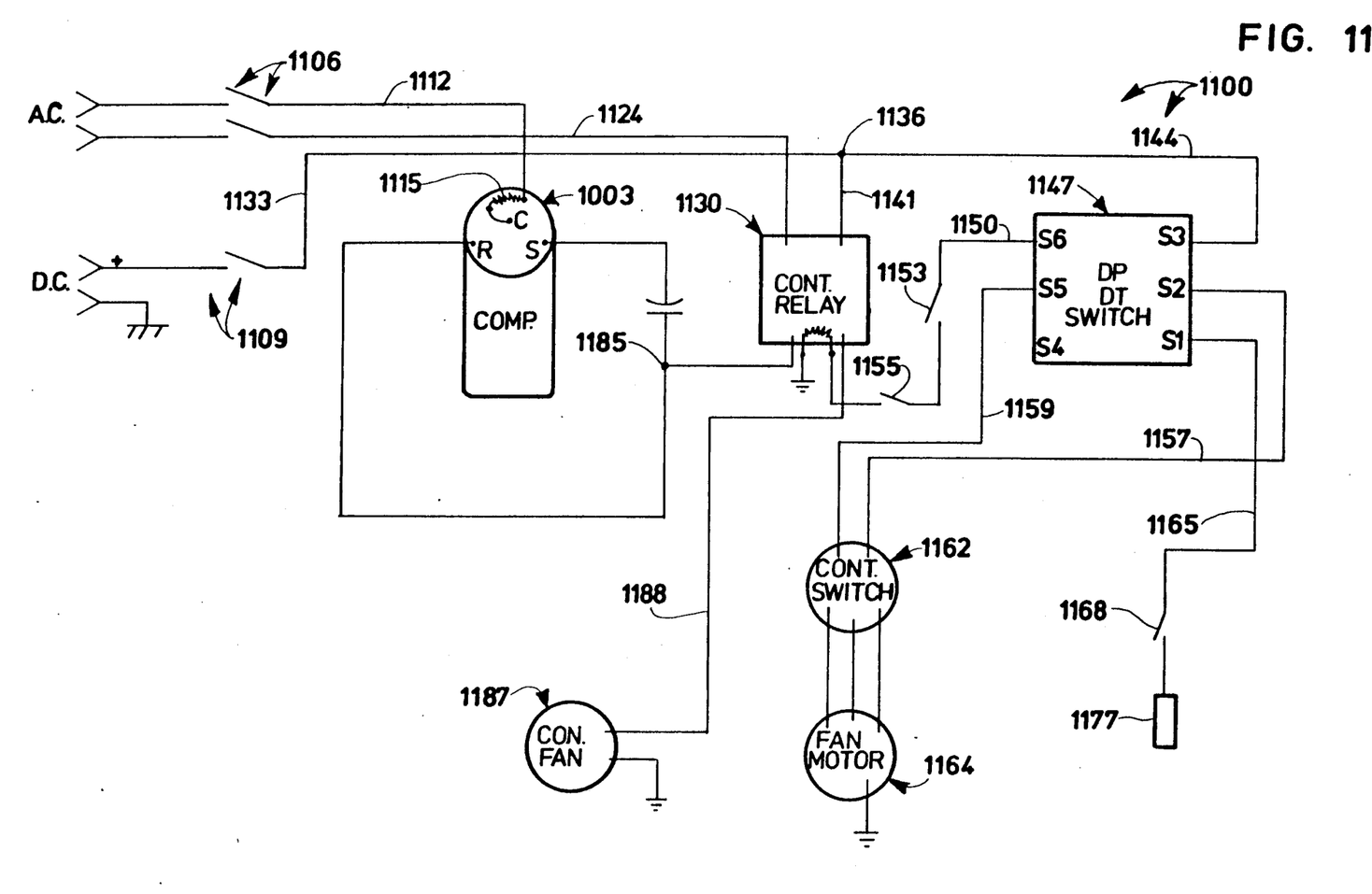
FIG. 11 is a preferred circuit diagram for the dual coil system of FIGS. 9 and 10; and, FIG. 12 is a diagrammatic view illustrating installation of our dual evaporator coil system to an existing vehicle air conditioning system.

FIG. 11 illustrates the preferred electrical system 1100 of the alternative installation 1000. User-accessible controls are electrically coupled to a 115-V AC D.P.S.T. switch 1106, and a S.P.S.T. 12-V DC power switch 1109. Line 1112 couples D.P.S.T. switch 1106 to a compressor overload protector 1115 associated with the compressor 1003. Switch 1106 is also coupled via line 1124 to control relay 1130. Line 1133 connects switch 1109 via node 1136 and line 1141 to control relay 1130, and via line 1144 to contact S3 on manual select switch 1147.

Switch 1147 is coupled at contact S6 to line 1150 and series-connected thermostat control switches 1153 and 1155 which can activate the relay field of control relay 1130. When activated, relay 1130 will transmit D.C. to condenser fan 1187 via line 1188 for activation. Simultaneously, node 1185 energizes the compressor 1003 with A.C. switched by relay 1130 from line 1124. Lines 1157 and 1159 associated with contacts S2, S5 respectively couple the select switch 1147 to the fan motor control switch 1162. Line 1165 leads from contact S1 of the select switch 1147 to an S.P.S.T. switch 1168 associated with the dashboard-mounted evaporator control, which is coupled to the vehicle fuse panel and designated as 1177. Direct current is thus transmitted to switch 1162 and thence to evaporator fan motor 1164 for activation. In this alternative installation, select switch contact S4 is not used.

It will be recognized by those skilled in the art that the various housings can be used in conjunction with both the single coil and "dual coil" evaporator devices disclosed. Also, the electrical control circuits shown can be interchanged as desired to fit the intended application.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An air conditioning system for vehicles, said system comprising:
   compressor means for compressing gaseous refrigerant;
   condenser means for cooling gaseous refrigerant received from said compressor means to provide liquid refrigerant;
   fan means for cooling said condenser means;
   Continental kit housing means for mounting said compressor means, said condenser means, and said fan means externally of said vehicle in a generally circular configuration;
   evaporator means disposed within said vehicle for cooling air, said evaporator means interconnected with said kit means; and,
   means for mounting said evaporator means within a door or panel of said vehicle.

2. The system as defined in claim 1 including receptacle means for mounting said compressor means, said condenser means, and said fan means within a generally circular configuration within said housing means.

3. The system as defined in claim 2 wherein said receptacle means comprises cage means for centrally mounting said condenser means and said fan means, and spaced apart wall means adapted to be fastened to said housing means.

4. The system as defined in claim 3 wherein said evaporator means comprises motor-powered blower means for discharging cooled air into said vehicle, adjustable louver means for selectively controlling the flow of said air as it is discharged, and filter means for filtering air cycled out of said vehicle through said evaporator into said system.

5. The system as defined in claim 4 including control means for operating said system, said control means comprising a console associated with said evaporator means, a power switch, and a fan speed switch operatively mounted on said console.

6. The system as defined in claim 5 further comprising circuit means adapted to be coupled to an external source of A.C. for powering said compressor from A.C. voltage, and converter means for simultaneously powering said evaporator blower means with D.C. power.

7. The system as defined in claim 6 wherein said system is operatively connected to an existing vehicle air conditioner unit.

8. The system as defined in claim 6 including header means for distributing said fluid through said evaporator means and said condenser means.

9. The system as defined in claim 8 wherein said system may be selectively operated independent of or in conjunction with said existing vehicle air conditioner unit.

10. An auxiliary air conditioning system for vehicles, said system comprising:
    compressor means for compressing gaseous refrigerant;
    condenser means for cooling gaseous refrigerant received from said compressor means to provide liquid refrigerant;
    fan means for cooling said condenser means;
    evaporator means disposed within said vehicle for cooling air, said evaporator means interconnected with said housing means and comprising motor-powered blower means for discharging cooled air into said vehicle, wherein said evaporator means comprises a dual coil heat exchanger operatively connected to an existing vehicle air conditioner system;
    means for flushly mounting said evaporator means within said vehicle;
    control means for operating said system from a an external source of A.C. power, said control means comprising a console associated with said evaporator means, and circuit means for powering said compressor means from A.C. voltage while simultaneously powering said evaporator means with D.C. voltage; and, Continental kit means for mounting said compressor means, said condenser means, and said fan means externally of said vehicle in a generally circular configuration.

11. The system as defined in claim 10 including auxiliary air conditioning circuit means for independently operating said duel coil heat exchanger to function as an evaporator for either said air conditioning system or said existing vehicle air conditioning system whereby said system may be selectively operated independently of or in conjunction with said existing vehicle air conditioner unit.

12. An auxiliary air conditioning system for vehicles, said system comprising:
    compressor means for compressing gaseous refrigerant;
    condenser means for cooling gaseous refrigerant received from said compressor means to provide liquid refrigerant;
    fan means for cooling said condenser means;
    housing means for mounting said compressor means, said condenser means, and said fan means;
    dual coil evaporator means disposed within said vehicle for cooling air, said evaporator means interconnected with said housing means and adapted to be interconnected with the original air conditioning system within said vehicle and comprising motor-powered blower means for discharging cooled air into said vehicle;
    means for flushly mounting said evaporator means within said vehicle; and, control means for operating said system from a an external source of A.C. power, said control means comprising a console associated with said evaporator means, and circuit means for powering said compressor means from A.C. voltage while simultaneously powering said evaporator means with D.C. voltage;

whereby said auxiliary air conditioning system may be operated either independently of or in conjunction with said original vehicle air conditioning system; and, wherein said housing means comprises Continental kit means for mounting said compressor means, said condenser means, and said fan means externally of said vehicle in a generally circular configuration.

* * * * *